Feb. 3, 1970     T. G. SCHMIDT     3,492,743
EDUCATIONAL ART DEVICE
Filed Nov. 6, 1967
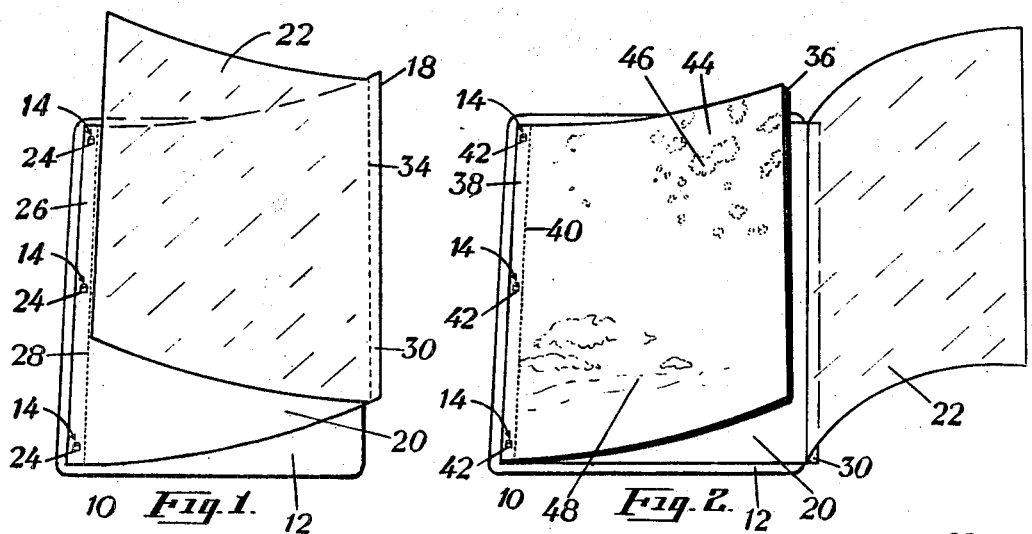
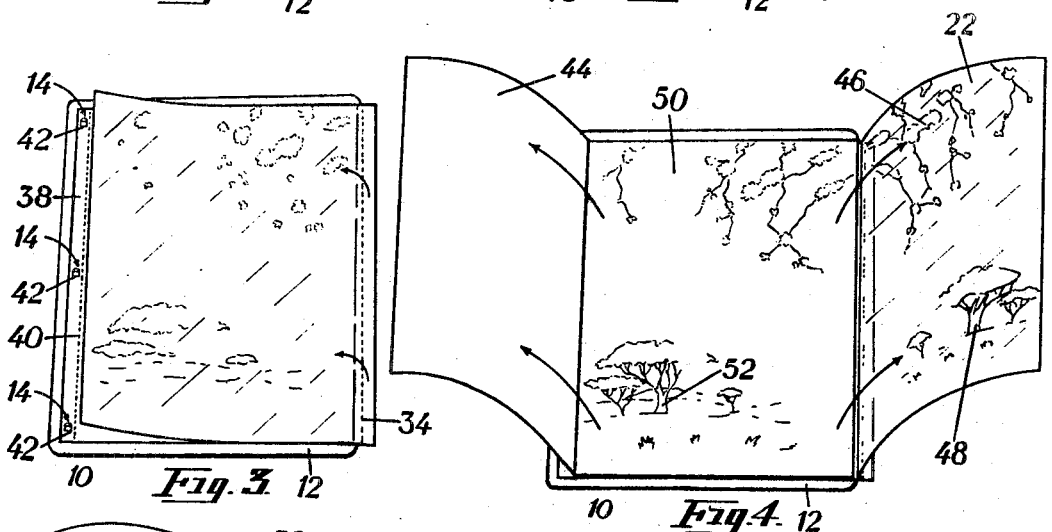
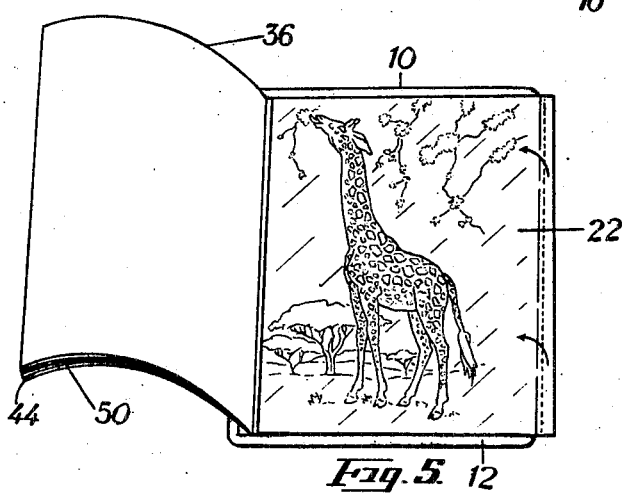
INVENTOR.
Theodore G. Schmidt
BY

United States Patent Office 3,492,743
Patented Feb. 3, 1970

3,492,743
EDUCATIONAL ART DEVICE
Theodore G. Schmidt, 12517 Rosebud Drive,
Rockville, Md. 20853
Filed Nov. 6, 1967, Ser. No. 680,889
Int. Cl. G09b 11/04
U.S. Cl. 35—26    3 Claims

ABSTRACT OF THE DISCLOSURE

The device of the present invention comprises a means for drawing a picture by tracing it from a plurality of opaque leaves that are bound together adjacent one margin thereof. The device is provided with a transparent or translucent sheet that can be positioned so as to overlap the plurality of individual sheets, and the individual sheets have indicia thereon which form a part of the completed picture. The plurality of leaves are disposed in registry with each other, and the translucent sheet which is the tracing sheet is disposed over one of the individual leaves, and the portion of the picture is traced therefrom onto the translucent sheet. Thereafter the leaf from which the part of the drawing or picture has been copied is turned over or folded back out of the way, and the translucent sheet is disposed adjacent another of the plurality of leaves upon which another portion of the picture to be traced is disposed, and successive portions of the picture are traced onto the translucent sheet until the picture is complete. The leaves bearing the parts of the picture to be traced are secured together along a marginal portion thereof so that the sheets are in registry with each other, and peg and slot means are provided along this marginal portion so as to maintain the individual leaves in registry with each other and in a predetermined position upon a backing board, and the translucent sheet is also provided with means for properly securing it in a predetermined position with respect to the backing board and the plurality of individual leaves.

---

The present invention relates to an educational art device and more particularly to a device that can be used to teach an untrained individual the rudiments of drawings and the development of the necessary skill in the art of making pictures.

It is an object of the present invention to provide a drawing device that is provided with a plurality of individual sheets disposed in a stacked relationship with one another and with pictorial material thereon all of which material, when disposed on a single sheet of drawing paper, forms a completed picture.

It is yet another object of the present invention to provide an educational and amusement device to develop the skill of freehand drawing by providing simple guide means consisting of incompleted parts of the composite picture for tracing by the individual so as to complete the finished drawing desired.

Another object of the present invention is to provide a plurality of individual sheets of paper which form individual opaque leaves, with the leaves being secured together along one marginal portion thereof and with each leaf bearing one of the parts of the completed picture, with the leaves being disposed in registry with one another and having fold line means along the marginal portion so that the individual leaves may be folded into registry with each other at one time and folded out of registry with one another at another time, and which device is further provided with a transparent or translucent sheet upon which the finished and completed picture is to be drawn, which sheet is also provided with means for disposing the translucent sheet in registry with the plurality of opaque leaves upon which the parts of the picture are printed, so that the various parts of the completed picture can be copied from the individual opaque leaves onto the translucent sheet in order to form a composite and completed picture.

It is another object of the present invention to provide an educational art device comprising a packet of individual opaque leaves or sheets of material which carry fragmentary pictorial views, and which sheets are in registry with one another and have fold line means along one portion thereof so that the individual sheets may be folded out of alignment with each other, and which device is further provided with a single translucent leaf or sheet of drawing paper through which the parts of the picture to be copied upon the translucent sheet of paper can be seen through said translucent sheet when it is disposed over any one of the opaque leaves and copied thereon.

It is yet another object of the present invention to provide means for holding the single translucent leaf or sheet paper in fixed interleafable relationship to the plurality of the individual opaque leaves or sheets of material upon which various parts of the completed picture are printed, so that the respective portions of the completed picture may be separately copied or traced upon the translucent sheet of material from the individual packet of opaque leaves or sheets of material.

Various other objects and advantages of the present invention will be readily apparent from the following detailed description when considered in connection with the accompanying drawings forming a part thereof and in which:

FIGURE 1 is a perspective view of the educational art device of the present invention, illustrating the assemblage of the translucent sheet upon backing board of the device;

FIGURE 2 is a perspective view of the assemblage of the plurality of individual opaque sheets bearing one of the parts of the picture on each sheet, upon backing member or board;

FIGURE 3 is a view similar to FIGURE 2 except that it illustrates the translucent sheet in registry with the top opaque sheet of the plurality of individual opaque sheets bearing the parts of the picture thereon;

FIGURE 4 illustrates the step of folding outwardly, along a marginal portion, the opaque sheet that has been traced upon the translucent sheet, and this view further illustrates the step of folding outwardly the translucent sheet so that it can be thereafter folded inwardly in registry with another of the opaque leaves bearing another portion of the picture to be traced on said translucent sheet; and FIGURE 5 illustrates all of the packet of opaque sheets bearing the parts of the picture to be traced thereon, except that the last sheet, with the translucent sheet folded inwardly over the last sheet so as to trace therefrom the last portion of the picture forming the completed picture.

Referring to the drawings, the reference numeral 10 generally designates the educational and amusement art device of the present invention, and is provided with a substantially thin, flat, rectangular shaped backing or base member 12, preferably made of cardboard or hardboard such as Masonite or the like. As best seen in FIGURE 1, the backing member 12 has disposed on the left marginal portion thereof a plurality of vertically spaced peg members secured to the upper side or front of the backing member by any suitable well known means, so that they project upwardly therefrom. The peg members 14 are disposed adjacent the top and the bottom and the middle of the left marginal portion of the backing member 12, although it is apparent that, if desired, a greater number of peg members may be provided. The member 18 upon which the picture is to be reproduced or copied comprises two sections or portions 20 and 22. The portion 20 consists of an opaque sheet of material with slots or openings 24 therein which are disposed so as to correspond to receive the pegs 14 therethrough when the sheet section 20 is properly positioned for drawing a picture on the translucent section or sheet 22 of the device.

Margin 26 of the section 20 of the copy sheet member 18 is provided with a vertical perforated score line 28 for tearing off the section 20 from the left margin 26 thereof. The right marginal portion 30 of the backing section 20 of the member 18 has secured thereto the right marginal portion of the translucent sheet section 22 by any suitable means such as an adhesive. The translucent sheet 22 is provided with a vertical perforated line 34 extending therealong so that the translucent sheet section 22 may be torn away from the rear sheet section 20. The perforated line 34 also permits the translucent sheet 22 to be folded inwardly over the sheet section 20 as best seen in FIGURE 1, and folded outwardly away from the sheet section 20, as best seen in FIGURE 2, so that the sheet 22 is out of alignment or registry with the section 20.

Referring to FIGURE 2, the device is provided with a plurality of individual opaque leaves or sheets 36 having a left marginal portion 38 and a vertical perforated line 40, with all the perforated lines 40 of the individual plurality of sheets being in registry with each other or in alignment with each other. The individual sheets 36 are secured together by adhesive or any other suitable means along their common marginal portion 38. The marginal portions 38 of the plurality of sheets are further provided with slots or openings 42 therein which correspond with the position of the slots 24 in the sheet section 20, and are disposed on the sheets 36 so as to receive the pegs 14 therethrough in order to properly secure the packet of sheets 36 upon the backing member. Each of the sheets 36 is provided with indicia or lines depicting or bearing a portion of or parts of a picture to be reproduced on the translucent sheet section 22. For example, the top sheet 44 of the plurality of sheets 36, as seen in FIGURES 2 and 3, contains part of the picture to be reproduced, depicting leaves 46 and grass or terrain 48, while the copy sheet 50 disposed in registry with the sheet 44 just below it, as best seen in FIGURE 4, depicts thereon portions 52 of the picture including the tree trunk and stems and branches of trees.

Any number of opaque sheets 36 may be provided carrying or bearing or depicting incomplete parts of the composite or finished picture to be drawn therefrom.

In assembling the educational art device of the present invention for use by an individual in order to trace or copy a completed picture, the backing member is first taken and the translucent sheet member 18 is affixed thereto by pressing the slots or openings 24 in the left margin 26 of the sheet on the projecting peg members 14. At this time the device then assumes the assemblage shown in FIGURE 1. Thereafter the translucent sheet section 22 is folded outwardly, as best seen in FIGURE 2, and the packet or plurality of individual sheets 36 have their slots or openings 42 disposed on the peg members 14 so that the marginal portion 38 of the sheets 36 is then affixed or secured to the peg members 14. The translucent sheet 22 is then folded in the direction indicated by the arrows in FIGURE 3 until it is in registry or alignment over the sheets 36 and over the top sheet 44 upon which is disposed or depicted the tree leaves 46. Thereafter the artist or the drawer traces through the translucent sheet section 22 the tree leaves 46 onto the sheet 22, and the other portions 48 on the sheet 44. This is shown in FIGURE 4. Thereafter the translucent sheet 22 is folded outwardly along its perforated line, as indicated by the arrows in FIGURE 4, and the top sheet 44 is also folded outwardly along its perforated line 40, so that the underlying sheet 50 just below the sheet 44 then becomes the top sheet. Thereafter the translucent sheet 22 is folded inwardly along its perforated line until it is in registry with the sheet 50. Then the artist or the drawer copies and traces the portions of the picture depicted on the sheet 50 upon the translucent sheet 22.

Sheet 50 is then folded outwardly and over the sheet 44, as the sheet 44 was folded outwardly, and the translucent sheet is then returned or folded inwardly so as to be in registry with the sheet below the sheet 50, and the portions of the picture from the next underlying sheet are traced on the translucent sheet 22. These steps are repeated with each new sheet upon which is depicted another portion or part of the picture, and this portion or part of the picture is traced on the translucent sheet 22 until the composite or complete picture has been reproduced on the translucent sheet 22.

Thereafter the translucent sheet 22 has depicted thereon the completed picture, which for purposes of illustration is the scene of a giraffe in the terrain where he is usually found.

A particular advantage from the teaching point of view contemplates that each of the sheets 36 shall carry that portion of the total picture that is best rendered in one color. If desired, that portion could be printed in the color to be rendered but tracing will be facilitated by printing all of the sheets in black. If desired, the individual sheets may carry either a direction or at least a hint or suggestion as to the proper color to use. When this practice is followed, the completed picture on sheet 22 will be an attractive multi-color representation suited for display.

Inasmuch as various changes may be made in the location and arrangement of the relative part and in the form of the several parts without departing from the essential characteristics of the invention, it will be understood that the invention is not to be limited except by the scope of the appended claims.

What is claimed is:

1. A tracing device comprising a thin, flat, stiff backing member having a plurality of individual opaque sheets each with indicia thereon depicting a part of a picture to be copied, said sheets having a common vertically extending marginal portion along which they are secured together in overlapping registered relationship, said sheets being also foldable adjacent said marginal portion into overlapping registry with each other, a plurality of vertically projecting pegs on said backing member extending outwardly from said sheets disposed along one marginal edge of said stiff member, slot means on said opaque sheets for receiving said pegs therethrough for detachably securing said opaque sheets to said backing member, said slot means being openings disposed in spaced relation along said marginal portion adapted to encircle said pegs, a translucent tracing sheet for laying over said opaque sheets for tracing said picture parts onto said translucent sheet, said translucent sheet being provided with a rear section with slot means adapted to receive said pegs, and having a marginal portion disposed opposite the marginal portion of said opaque sheets, and means provided on said opaque sheets and said translucent sheet for folding said sheets into overlapping registry at one time and out of overlapping registry at another time.

2. The device of claim 1 wherein said translucent sheet is secured to the marginal portion of said rear section and is foldable into overlapping registry with said opaque sheets along its marginal portion where it is secured to its rear section.

3. The device of claim 1 wherein said opaque sheets are foldable in one direction along one side of said stiff member and said translucent sheet is foldable in another direction along the opposite side of said stiff member.

References Cited
UNITED STATES PATENTS

| | | | |
|---|---|---|---|
| 2,103,943 | 12/1937 | Gorton | 35—26 |
| 2,258,603 | 10/1941 | Forbell | 35—26 |
| 2,883,767 | 4/1959 | Bell et al. | 35—35 |
| 3,419,971 | 1/1969 | Ribkin | 35—26 |

FOREIGN PATENTS 384,919  12/1932  Great Britain.

EUGENE R. CAPOZIO, Primary Examiner

HARLAND S. SKOGQUIST, Assistant Examiner

U.S. Cl. X.R.

281—15